(12) United States Patent
Provost et al.

(10) Patent No.: US 7,376,306 B2
(45) Date of Patent: May 20, 2008

(54) SLANTED BRAGG GRATING GAIN FLATTENING FILTER HAVING SPATIALLY OVERLAPPING ELEMENTARY FILTERS AND A MANUFACTURING METHOD THEREFOR

(75) Inventors: Lionel A. Provost, Marcoussis (FR); Marianne Molina, Paris (FR); Xavier Bonnet, Saint Rémy lès Chevreuse (FR); Carlos Luis De Barros, Boulogne Billancourt (FR)

(73) Assignee: Avanex Corporation, Fremont, CA (US)

( * ) Notice: Subject to any disclaimer, the term of this patent is extended or adjusted under 35 U.S.C. 154(b) by 268 days.

(21) Appl. No.: 10/928,293

(22) Filed: Aug. 26, 2004

(65) Prior Publication Data

US 2006/0045422 A1    Mar. 2, 2006

(51) Int. Cl.
*G02B 6/34* (2006.01)
(52) U.S. Cl. .............................. 385/37; 385/15; 385/31
(58) Field of Classification Search .................. 385/15, 385/31, 37
See application file for complete search history.

(56) References Cited

U.S. PATENT DOCUMENTS

| | | | | |
|---|---|---|---|---|
| 5,638,473 A | * | 6/1997 | Byron | 385/37 |
| 6,067,391 A | * | 5/2000 | Land | 385/27 |
| 6,275,511 B1 | * | 8/2001 | Pan et al. | 372/6 |
| 6,834,144 B2 | * | 12/2004 | Belmonte et al. | 385/37 |
| 6,954,567 B2 | * | 10/2005 | Molina et al. | 385/37 |

* cited by examiner

Primary Examiner—Jennifer Doan
(74) Attorney, Agent, or Firm—Patterson & Sheridan, LLP

(57) ABSTRACT

An optical filter comprises a waveguide and a plurality of Slanted Bragg Gratings written in the waveguide, wherein at least two of the Slanted Bragg Gratings overlap one another. A method of producing an optical filter comprises the steps of passing an ultraviolet light through a first portion of a chirped phase mask onto a first portion of a photosensitive waveguide so as to form a first Slanted Bragg Grating in the first portion of the waveguide and passing the ultraviolet light through a second portion of the chirped phase mask onto a second portion of the photosensitive waveguide so as to form a second Slanted Bragg Grating in the second portion of the waveguide, wherein the first and second Slanted Bragg Gratings overlap one another. A further annealing step may cause a spectrum of the filter to match a target spectrum.

12 Claims, 10 Drawing Sheets

SLANTED BRAGG GRATING GAIN FLATTENING FILTER HAVING SPATIALLY OVERLAPPING ELEMENTARY FILTERS AND A MANUFACTURING METHOD THEREFOR

FIELD OF THE INVENTION

The present invention relates to passive spectrally specific attenuators for optical transmission systems and, more precisely, to devices utilized for balancing the gain output spectrum of optical amplifiers such as Erbium-Doped fiber amplifiers (EDFAs), within both terrestrial and submarine transmission links.

BACKGROUND OF THE INVENTION

Gain-equalizing filters, also known by the acronym GFF, which stands for "Gain Flattening Filter", generally consist of Bragg gratings photo-written on portions of waveguides such as optical fibers or planar waveguides. A waveguide is conventionally composed of an optical core whose function is to transmit and possibly amplify an optical signal, surrounded by an optical cladding whose function is to confine the optical signal in the core. To this end, the refractive index, $n_1$, of the core and the refractive index, $n_2$, of the cladding are such that $n_1 > n_2$. As is well known, the propagation of an optical signal in a single-mode waveguide breaks down into a fundamental mode guided in the core and secondary modes, also referred to as cladding modes, which are guided over a certain distance in the optical core/cladding assembly.

Either the core or the cladding of a waveguide can be "doped", for example with germanium (Ge), so as to be made photosensitive for writing Bragg gratings within the waveguide. The gratings conventionally used for gain flattening applications are slanted Bragg gratings, known by the acronym SBG, or Long-Period Gratings, known by the acronym LPG. Such gratings do not reflect light wavelengths back into the core but are, instead, designed to allow coupling of the fundamental mode (of specific wavelengths) into the cladding modes. The use of such SBG or LPG gratings makes it possible to dispense with optical isolators, which are otherwise essential when the gain flattening is achieved with reflective gratings such as straight Bragg gratings.

Gain flattening filters are associated with optical amplifiers regularly distributed along transmission lines. As is well known, optical amplifiers do not generally provide equal amplification for all wavelengths of the signals transmitted over the various channels of the same transmission line. Since a signal carried on one wavelength (or channel) cannot be amplified preferentially to another signal carried on another wavelength, gain flattening filters are employed to keep the optical power constant within all channels. As is well known, a gain-flattening filter restores the power of all channels output from an optical amplifier to a common level by preferentially attenuating those channels that receive the greatest gain within the amplifier. For instance, a gain flattening filter (GFF) may be coupled to the output of an Erbium-Doped Fiber Amplifier (EDFA). Alternatively, a GFF may be incorporated into the EDFA itself within which it may be optically coupled to the signal output end of an Erbium-Doped Fiber or may be optically coupled between two lengths of Erbium-Doped Fiber. Since the gain function (gain vs. wavelength) of an optical amplifier can assume a complex shape, the transmission spectrum of gain flattening filters must be similarly complex and matched to the amplifier, in an inverse sense.

With the increase of bandwidth in WDM transmission and the multiplicity of possible designs according to properties of the transmission line specifications (length, power budget, etc.), and other intrinsic component dependent properties (e.g. gain, erbium response spectrum, etc.), the specifications and tolerances of the Gain Flattening Filters are stringent, particularly when considering the attenuation deviation error over the useful spectral range. It is extremely important to minimize any systematic deviations of the actual transmission spectrum from the actual shape required for perfect gain flattening, since such errors will accumulate over several spans of optical fiber line having several amplifiers. Thus, it is mandatory for the GFF spectral attenuation has to match the amplification curve of the EDFA within a close tolerance. Further, as optical amplifier technology evolves and the useful amplification spectral bandwidth increases, new attenuation functions, having even more complex spectral shapes and accentuated attenuation variations (i.e. steeper slopes) are required.

From a historical point of view, the realization of complex attenuating spectra in Gain Flattening filters was achieved, in the prior art, by concatenating a series (of a limited number, for instance, three) of specifically designed optical fibers, wherein one fiber Bragg grating filter was written into each fiber. Since each such fiber Bragg grating was devoted to attenuation within a particular spectral range, the overall attenuation function or properties were achieved through splicing or fusing several such FBG-bearing optical fibers parts together serially. This prior-art serial fiber gain flattening method was sufficient and sustainable as long as the spectral attenuation template was of a smooth classical shape—in the sense that no specific shape was required—that did not require adaptation to the needs of a particular application. Unfortunately, however, this serial fiber method suffers from poor sustainability and flexibility when shifting to more complex shapes, since, in such a case, development and selection of a new series of fiber Gratings, would require large expenditure of time.

To mitigate this drawback, it has been proposed to write the various slanted gratings on different portions of the same waveguide. Such a method is described in the patent application WO 93/24977. According to the contrast given to each grating, it is thus possible to model the response of the complex filter. Unfortunately, this prior-art requires as many writings through as many phase masks as there are elementary filters. The more complex the gain flattening profile, the higher the number of elementary SBG writings necessary for producing the complex flattening filter, which makes the manufacture of such filters more expensive.

To overcome these limitations, an improved apparatus and method was previously implemented in which a concatenation of several slanted Fiber Bragg Gratings is written into a single fiber through a single highly chirped phase mask (i.e., a diffraction grating whose spacing between grating rulings varies greatly along the mask along a direction perpendicular to the rulings) such that the whole gain flattening filter is comprised of the single fiber and, also, such that the value of the mean refractive index is constant throughout the fiber. This constant mean refractive index enables the minimization of the change of the spectral response at the annealing stage of the filter—a long-term stabilization of the device by application of a thermal treatment. Such a technique has been described in U.S. patent application Publication 2003-202745. A schematic illustration of a method for producing a gain-flattening filter according to this prior-art technique is shown in FIG. 1.

As shown in FIG. 1, the prior-art constant-mean-index SBG gain-flattening filter is manufactured by passing a UV beam 70-70a through a slit 60-60a and strongly chirped (typically 10 nm/cm) phase mask 50 onto a photosensitized fiber 38. The positions of the UV beam and/or the slit are moved relative to the phase mask 50 and fiber 38 using a translation support 80. Thus, in a first position, the UV beam 70 passes through the slit 60 so as to cause spatially filtered beam 72 to pass through portion 52 of the chirped phase mask 50 so as to generate elementary fiber Bragg grating filter 30.2 within the fiber 38. Subsequently, the positions of the UV beam and/or the slit are moved such that the UV beam, now represented as UV beam 70a, passes through the slit, represented as slit 60a, so as to cause spatially filtered beam 72a to pass through portion 52a of phase mask 50 so as to generate another elementary Bragg grating 30.3 within fiber 38. Other elementary fiber Bragg gratings, such as grating 30.1, etc., may be inscribed in the fiber 38 by irradiations at other positions. The grating rulings within the strongly chirped phase mask 50 are oriented such that each of the elementary fiber Bragg gratings 30.1, 30.2, 30.3, etc. is a slanted Bragg grating. The strongly chirped mask makes it possible to systematically change the spectral positions (i.e., the cladding-mode-coupled wavelengths) of the fiber Bragg gratings, relative to one another, along the length of the fiber. The whole useful spectral band is therefore easily covered over a reduced (less than about 30 mm for the C-band) fiber length.

In the prior-art constant-mean-index SBG gain-flattening filter technique (FIG. 1), the synthesis of the overall spectral shape of the gain flattening filter function is accomplished using elementary filter shapes that are equally spaced in wavelength. To fabricate each elementary filter 30.1, 30.2, 30.3, etc., the UV beam 72, 72a, etc. is positioned over a desired location 52, 52a, etc. on the strongly chirped mask 50 while the photosensitized fiber 38 is irradiated for a known time by the UV beam passing through said location on the phase mask. The position of the UV beam along the mask is then changed using a slit moving 60, 60a, etc. parallel to the length of the optical fiber 38. Because of the chirping of the phase mask 50, there is a straight correspondence between the UV beam position onto the strongly chirped masked and the spectral position (in wavelength) of the resulting Bragg grating written into the fiber.

In the prior-art constant-mean-index SBG gain-flattening filter technique (FIG. 1), the sequential position displacement of the UV-beam over the phase mask between consecutive positions, so as to produce consecutive elementary filters, is periodic (i.e. constant). This displacement, $\Delta x$, between successive UV beam positions, and, therefore, between each pair of adjacent filters of the n elementary filters 30.1-30.n, is equal to the UV-beam width (slit width) as shown in FIG. 2. This latter condition was imposed so that there would be no spatial overlap between two consecutive UV-irradiated regions onto the mask (FIG. 2). The distance $\Delta L$ is the length of each elementary fiber Bragg grating filter. As shown in FIG. 2, $\Delta L=\Delta x$. Since there is a direct correspondence between the UV-beam position, relative to the mask, and the spectral filter position, in wavelength, each attenuating filter is equally spaced, in both wavelength and position with each neighboring filter. The spectral displacement, value, $\Delta\lambda$, between successive elementary filters is given by the relationship $\Delta\lambda=n_{eff}\Delta L\,C$, where $n_{eff}$ is the effective refractive index of the guided mode and C is the chirp value of the phase mask (e.g. 10 nm/cm).

FIG. 3 is a graph 20 representing the synthesis of an attenuation curve 22 of a gain flattening filter, as produced by the prior-art single fiber SBG technique. The curve 22 is a summation of the transmission curves 24 of all the elementary fiber Bragg gratings 30.1, 30.2, 30.3, etc. The transmission curves 24 associated with the members of each pair of adjacent elementary Fiber Bragg Gratings are spaced $\Delta\lambda$ apart. The strength or contrast (related to the depth of the curve on FIG. 3) of each elementary filter, in terms of its ability to couple the targeted wavelength, is produced by varying the efficiency of the interference pattern while the elementary filter is being written. This may be accomplished by, among other methods, vibrating the slit back and forth about its central position. As a result, although the strengths of the various elementary filters are generally different, the writing time (UV irradiation) is set to be equal for each elementary filter. Consequently, the value of mean refractive index value is constant for all such elementary filters, since this depends on the total UV irradiation time.

Unfortunately, the prior art constant-mean-index method, described above, of producing a single-fiber gain-flattening filter has a few disadvantages. The first problem is in the way the apodization of the elementary filters is carried out—the requirement to obtain a constant mean refractive index causes the writing time to be identical for all the elementary filters, regardless of the target contrast (even for weak contrast values). As a result, the total UV exposure time can be very long with this method, thereby causing inefficiency in the manufacturing process.

A second problem with the above-described prior art method is related to the deviation error, relative to the desired attenuation spectrum. FIG. 4 is a graph 25 of raw and smoothed error deviations observed for a gain flattening filter produced by the prior-art technique of FIG. 1. The raw deviation is shown as curve 26 and the mathematically smoothed version of this deviation is shown as curve 27 in graph 25 (FIG. 4), both plotted with respect to wavelength. The smoothed curve 27 provides an indication of the low-order or average trends of the error curve. However, by comparing the raw curve 26 with the smoothed curve 27, it may be observed that the error curve contains higher-order small scale oscillations that are superimposed upon these average trends. To better display these oscillations, curve 28 shows, on an expanded scale, the difference spectrum, which is obtained by subtracting curve 27 from curve 26.

The curve 28 of graph 25 (FIG. 4) clearly shows the systematic small spectral scale oscillations that are experimentally observed in the error deviation spectrum for a filter manufactured by the prior-art method of FIG. 1. These oscillations arise from the fact that the elementary fiber Bragg grating positions do not overlap with each other in the fiber comprising the gain flattening filter. These systematic and reproducible oscillations create a problem for long-haul transmission over fiber optic spans encompassing several cascaded optical amplifiers because the errors are cumulative.

Finally, the prior-art method of producing a single-fiber gain-flattening filter prior solution is not usable for the synthesis of new spectral attenuation shapes exhibiting large variations at both extremities of the covered spectral range. Large spectrally limited variations imply large derivative values and, thus, a bad match between the synthesized attenuation curve and the desired attenuation spectrum curve for filters made with constant spaced elementary filters.

SUMMARY OF THE INVENTION

In order to overcome the aforementioned disadvantages of prior art fiber Bragg grating gain-flattening filters, an improved apparatus and method for a single-fiber Slanted Bragg Grating gain-flattening filter is herein provided. The principle of the apparatus and method of the present invention is based on a decomposition of the spectral shape of a target attenuation spectrum into several Gaussian-like attenuation curves, each of such Gaussian-like attenuation curves being provided by a respective elementary Slanted Fiber Bragg Gratings filter, at least one pair of adjacent elementary Slanted Fiber Bragg Gratings filters being spatially overlapping and having overlapping attenuation curves. The provision for overlapping elementary Slanted Fiber Bragg Gratings filters, within an apparatus and method according to the present invention, allows greater flexibility in the design of the shape of the attenuation curve of the gain-flattening filter to, especially within regions of large slope and at the extremities.

A preferred embodiment of a gain-flattening filter apparatus in accordance with the present invention comprises an optical waveguide, preferably, an optical fiber having a cladding and a core, wherein a plurality of Slanted Fiber Bragg gratings are written into one or both of the cladding and the core, wherein at least two of the Slanted Fiber Bragg Gratings are overlapping. Also, a preferred embodiment of a method, in accordance with the present invention, for manufacturing a gain-flattening filter apparatus comprises the steps of writing a plurality of Slanted Fiber Bragg Gratings into a photosensitized waveguide, preferably, an optical fiber, wherein at least two of the Slanted Fiber Bragg Gratings are overlapping.

BRIEF DESCRIPTION OF THE DRAWINGS

The object and features of the present invention can be more fully understood and better appreciated with reference to the attached drawings, wherein.

DETAILED DESCRIPTION OF THE PREFERRED EMBODIMENTS

The present invention relates to an improved Slanted Bragg Grating gain-flattening filter formed in a single fiber and to a method for manufacturing such a filter. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein. To more particularly appreciate the features and advantages of the present invention, the reader is referred to the appended FIGS. 5-8 in conjunction with the following discussion.

An apparatus in accordance with the present invention comprises a strongly chirped complex Slanted Bragg Grating within which the mean index is variable over the filter length and is directly related to the strength of reflection of a local elementary filter. A novelty of the present invention, directly linked to the non-constant mean index variation along the grating, is that the elementary filters may be partially spatially overlapped, with respect to both their spatial positions and their reflection spectra.

In general, SBG gratings are manufactured by irradiating a portion of a photosensitive optical fiber with an interference pattern using UV light at a pre-selected wavelength. This irradiation causes, within the fiber, two important changes: (1) development of a longitudinal periodic refractive index refraction change (also called index modulation change) that behaves as a Bragg grating and enables the coupling of incident light of a certain wavelength into backward dissipative cladding modes and (2) a constant refractive index increase (also called the mean refractive index change). Both of these characteristics are mandatory to impress a spectral loss (i.e., through back coupling into cladding modes). The coupling wavelength is directly proportional to the period of the periodic refractive index change. The strength of the reflection and the attenuation depth at this given wavelength are related to the level of the index modulation change. The mean refractive index change has the effect of slightly changing the effective index of the fiber modes and the coefficient of proportionality between the coupling wavelength and the period of the index modulation change.

Figure 5:
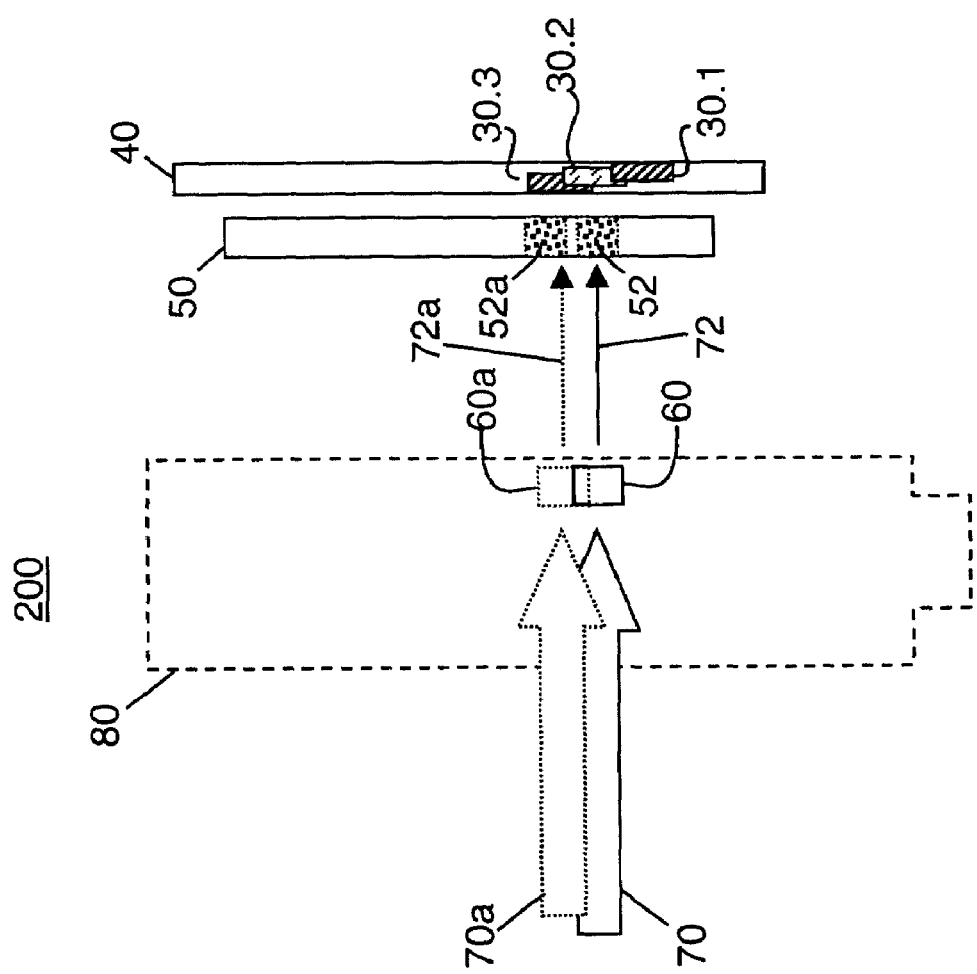
FIG. 5 is a diagram of an experimental set-up utilized for the fiber Bragg grating writing process in a preferred method, in accordance with the present invention, for fabricating a chirped Bragg grating gain flattening filter.

FIG. 5 shows a schematic illustration of a preferred method, in accordance with the present invention, for manufacturing a SBG gain flattening filter. In the method 200

(FIG. 5), a UV beam 70 is caused to pass through a slit 60 to form a spatially filtered UV beam 72 that passes through a strongly chirped phase mask 50 onto a photosensitized optical waveguide 40. Preferably, the waveguide 40 is an optical fiber but could also comprise, any waveguide such as, for instance, a planar waveguide. The interference pattern produced by the passage of the UV beam 72 through the portion 52 of the phase mask 50 causes the imprinting of an elementary slanted fiber Bragg grating 30.2 within the waveguide 40. The grating rulings within the strongly chirped phase mask 50 are oriented such that the elementary fiber Bragg gratings is a slanted grating.

Within the method 200 (FIG. 5), the positions of the UV beam and/or the slit are moved relative to the phase mask 50 and waveguide 40 using a translation support 80. Thus, in a first position, the UW beam 70 passes through the slit 60 so as to cause spatially filtered beam 72 to pass through portion 52 of the chirped phase mask 50 so as to generate elementary fiber Bragg grating filter 30.2 within the waveguide 40. Subsequently, the positions of the UV beam and/or the slit are moved such that the UV beam, now represented as UV beam 70a, passes through the slit, represented as slit 60a, so as to cause spatially filtered beam 72a to pass through portion 52a of phase mask 50 so as to generate elementary Bragg grating 30.3 within waveguide 40. Other elementary fiber Bragg gratings, such as grating 30.1, etc., may be inscribed in the waveguide 40 by irradiations at other positions.

Figure 1:
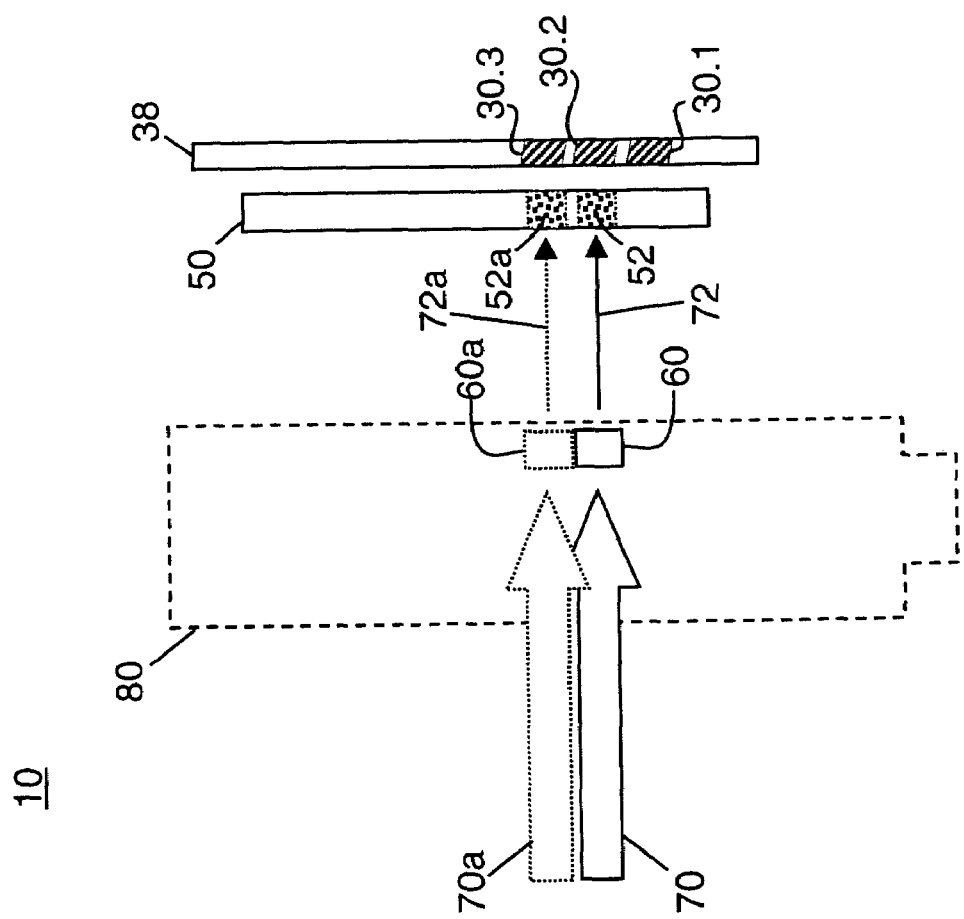
FIG. 1 is a diagram of an experimental set-up utilized for the fiber Bragg grating writing process in a prior-art technique for fabricating a chirped Bragg grating gain flattening filter.
Figure 2:
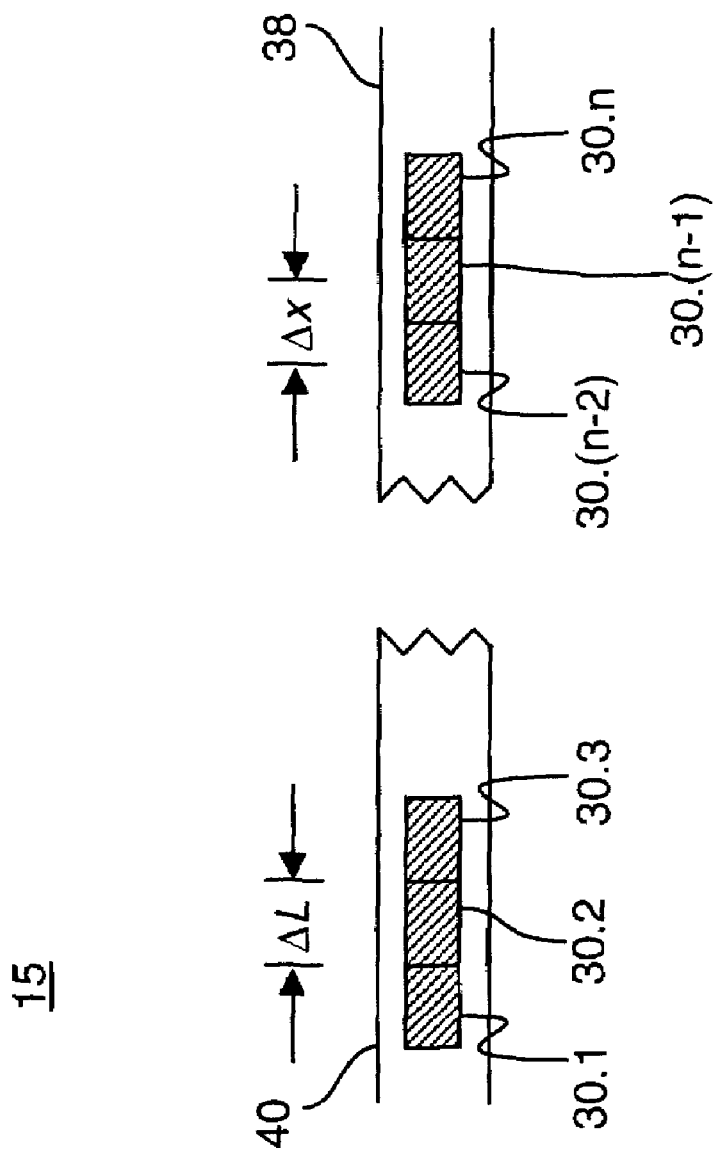
FIG. 2 is a schematic representation of the periodic spatial distribution of the elementary filters along the fiber as produced by the technique illustrated in FIG. 1.
Figure 3:
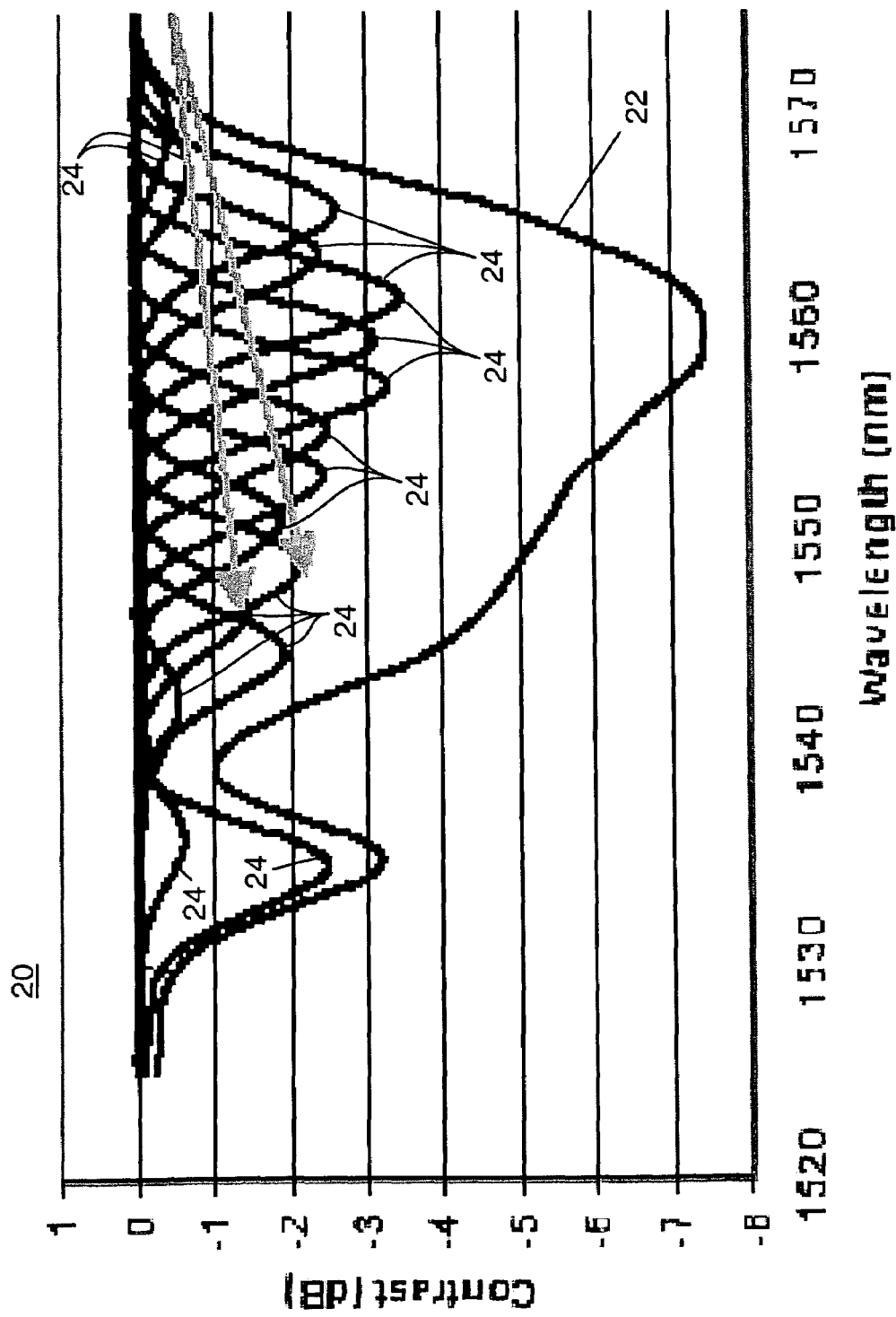
FIG. 3 is a graph representing the synthesis of an attenuation curve of a gain flattening filter, as produced by the prior-art technique of FIG. 1, as a summation of the transmission curves elementary fiber Bragg gratings.
Figure 4:
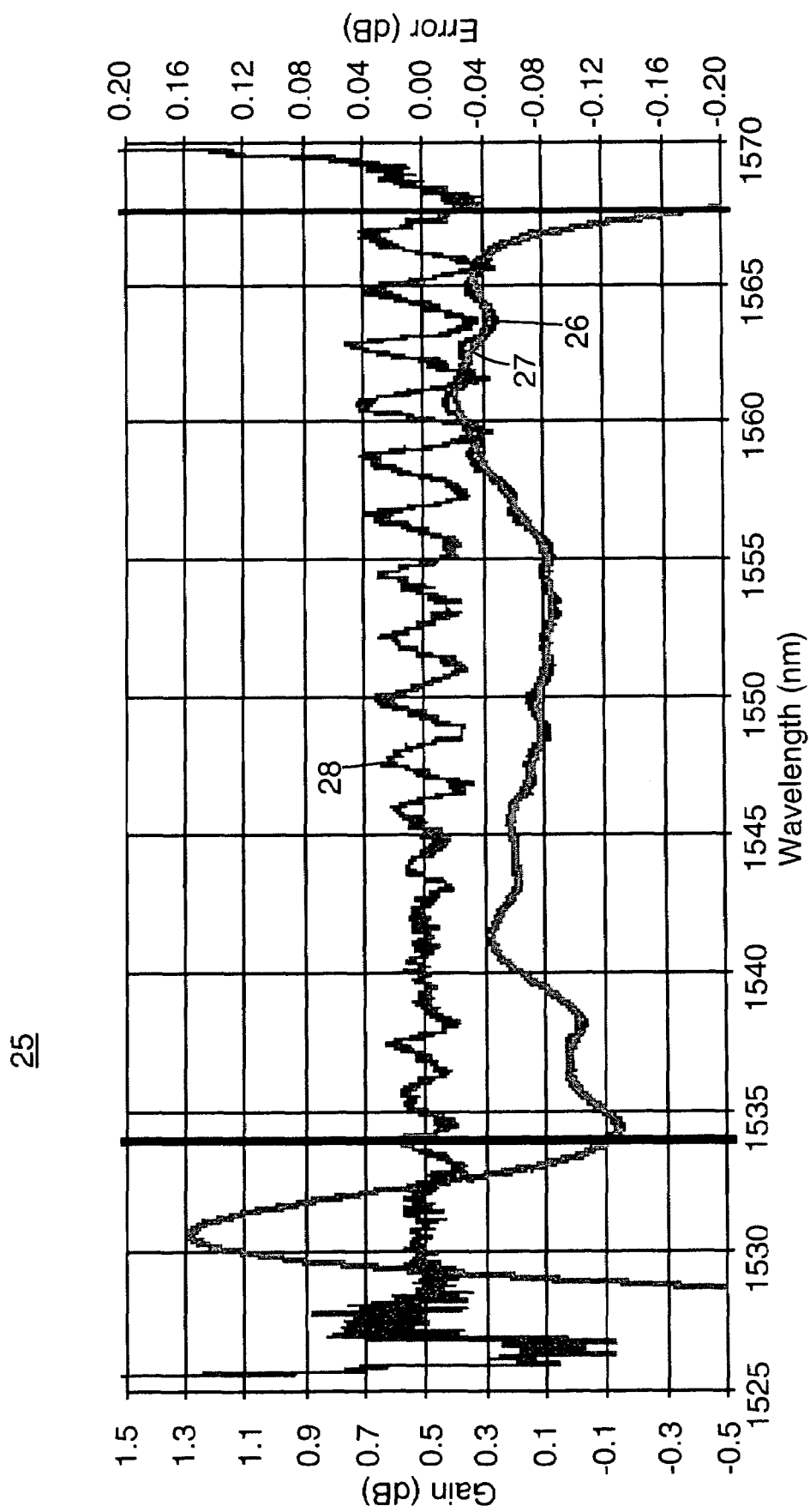
FIG. 4 is a graph of gross and smoothed error deviations and corresponding small-scale oscillations observed for a gain flattening filter produced by the prior-art technique of FIG. 1.

The manufacturing method in accordance with the present invention (FIG. 5) differs from the prior art manufacturing method shown in FIG. 1 via the fact that, in the instant method: (1) two consecutive irradiated zones of the photosensitized waveguide 40 may have a common spatial region (i.e. the adjacent irradiated regions and the resulting elementary fiber Bragg gratings overlap one another); (2) the lengths of the elementary gratings are generally not identical; (3) the spacings between the centers of pairs of adjacent gratings are not constant (i.e., are aperiodic); and (4) the size of the various overlap regions between adjacent elementary gratings are also not constant. Manufacturing this complex grating requires the inscription should be subdivided into a series of elementary FBG filters of length ranging between 0.5 mm and 2 mm.

Figure 6:
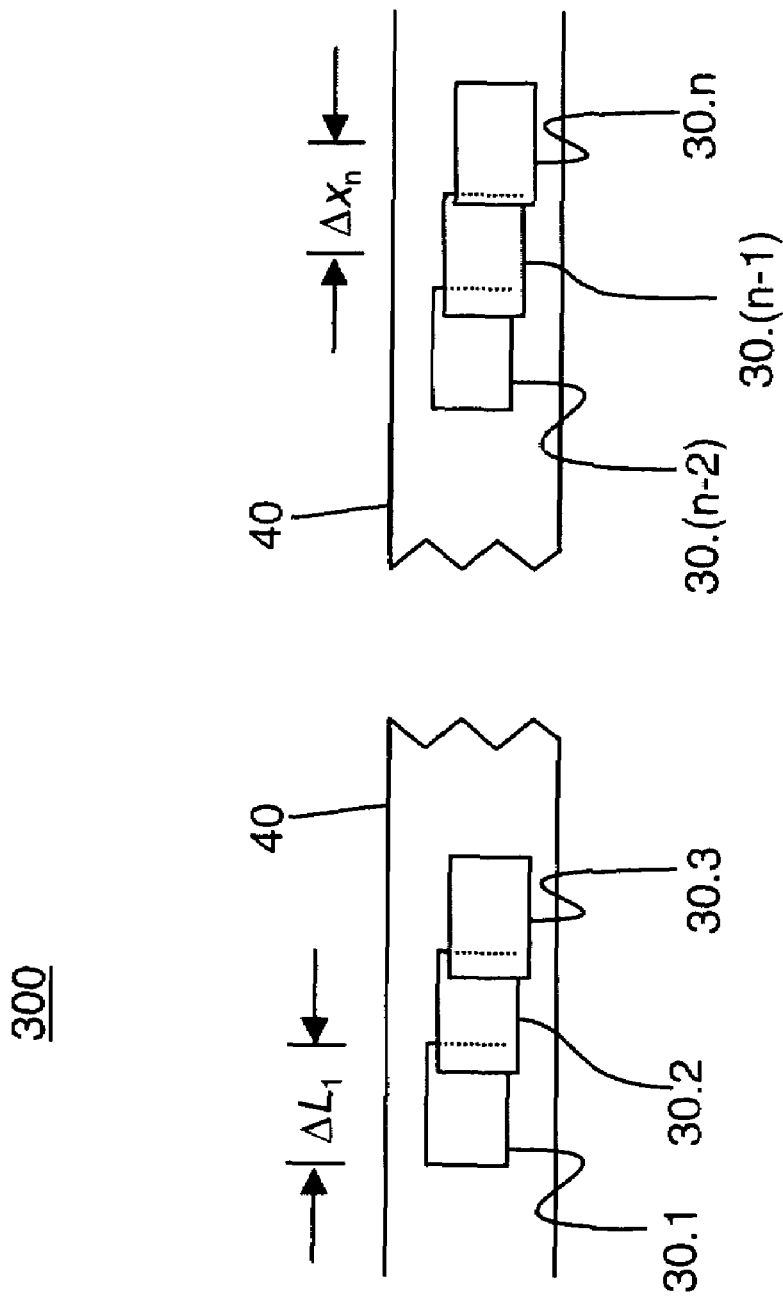
FIG. 6 is a schematic representation of the spatial distribution of elementary filters along a fiber portion within a gain flattening filter in accordance with the present invention.

FIG. 6 is a schematic illustration of a preferred embodiment of a gain flattening filter 300 in accordance with the present invention. The overlapping characteristics of the various elementary fiber Bragg gratings within the optical waveguide 40 comprising the filter 300 are shown in detail in FIG. 6. Preferably, the waveguide 40 is an optical fiber (as drawn in FIG. 6) but can be any type of optical waveguide. It is to be noted that, in both FIG. 5 and FIG. 6, the gratings are drawn with fictitious offsets perpendicular to the length or axis of the fiber 40. These fictitious offsets are drawn so as to more clearly show overlapping characteristics of the elementary gratings and are not to be interpreted as actual physical features of the invention. The gain-flattening filter 300 may comprise any desired number, n, of elementary SBG filters, 30.1-30.n. As shown in FIG. 6, each elementary SBG filter $n_i$ comprises a grating length $\Delta L_i$ ($1 \leq i \leq n$). Also, there is a separation distance $\Delta x_i$ ($2 \leq i \leq n$) between the centers of adjacent elementary filters. The values of $\Delta L_i$ and $\Delta x_i$ are determined by the width and the position, respectively, of the slit 60. In the present invention, these operational parameters (slit width and position) are completely arbitrary and may differ between elementary gratings and pairs of elementary gratings, depending upon the requirements of the target transmission spectrum (or "template") of the final gain-flattening filter. However, there will exist at least one pair of elementary filters that has a common UV-irradiated region and, therefore, a common or overlapping grating region.

Because of the above-mentioned relaxation of constraints on the properties of the elementary filters, more degrees of freedom are available in the modeling of a target or template spectrum as a summation of spectra derived from elementary filters. That is, the distance between adjacent elementary filters—both in position and in wavelength—may be optimized according to the required spectral slope in the vicinity of the reflection wavelengths of the filters. Accordingly, a filter manufactured in accordance with a method of the present invention is better able to fit template spectra within high attenuation transition regions at range extremities. This permits increased versatility in filter design. The longitudinal mean refractive index distribution and the index modulation change (determining the reflection wavelength and the reflection strength of an elementary filter, respectively) are controlled, within the present invention, by choosing the irradiation conditions of the UV-beam on the strongly chirped mask so as to produce an optimal set of elementary fiber Bragg grating filters.

Concretely speaking, the final mean refractive index and the final refractive index modulation at a given point in the gain flattening filter 300 produced in accordance with the present invention will be obtained from a contribution of one or more index changes induced by the writing of one or more elementary filters. The changes in optical properties that occur during the annealing stage of the final gain flattening filter as a result of the variation of the mean refractive index are taken into account during the initial modeling stage of the filter manufacture when the number and properties of individual elementary fiber Bragg gratings are computed. Thus, after writing the gratings, but prior to annealing, the gain-flattening filter does not have exactly the required transmission spectral profile. This profile then self adjusts to the target profile during the annealing stage.

The current solution has been proven to workable by modeling and by experiment. To clearly demonstrate the advantages of gain-flattening filters in accordance with and produced in accordance with the present invention, there is shown herein an experimental comparison, using the same target spectral template, between error deviations observed for filters produced using the prior art single-fiber constant-mean-index SBG technique (FIG. 1) and using a method in accordance with the present invention (FIG. 6). The advantages may be observed by comparing FIGS. 7a-7b, which show results obtained for the prior-art apparatus with FIGS. 8a-8b, which show results obtained for a gain-flattening filter in accordance with the present invention.

Figure 7A:
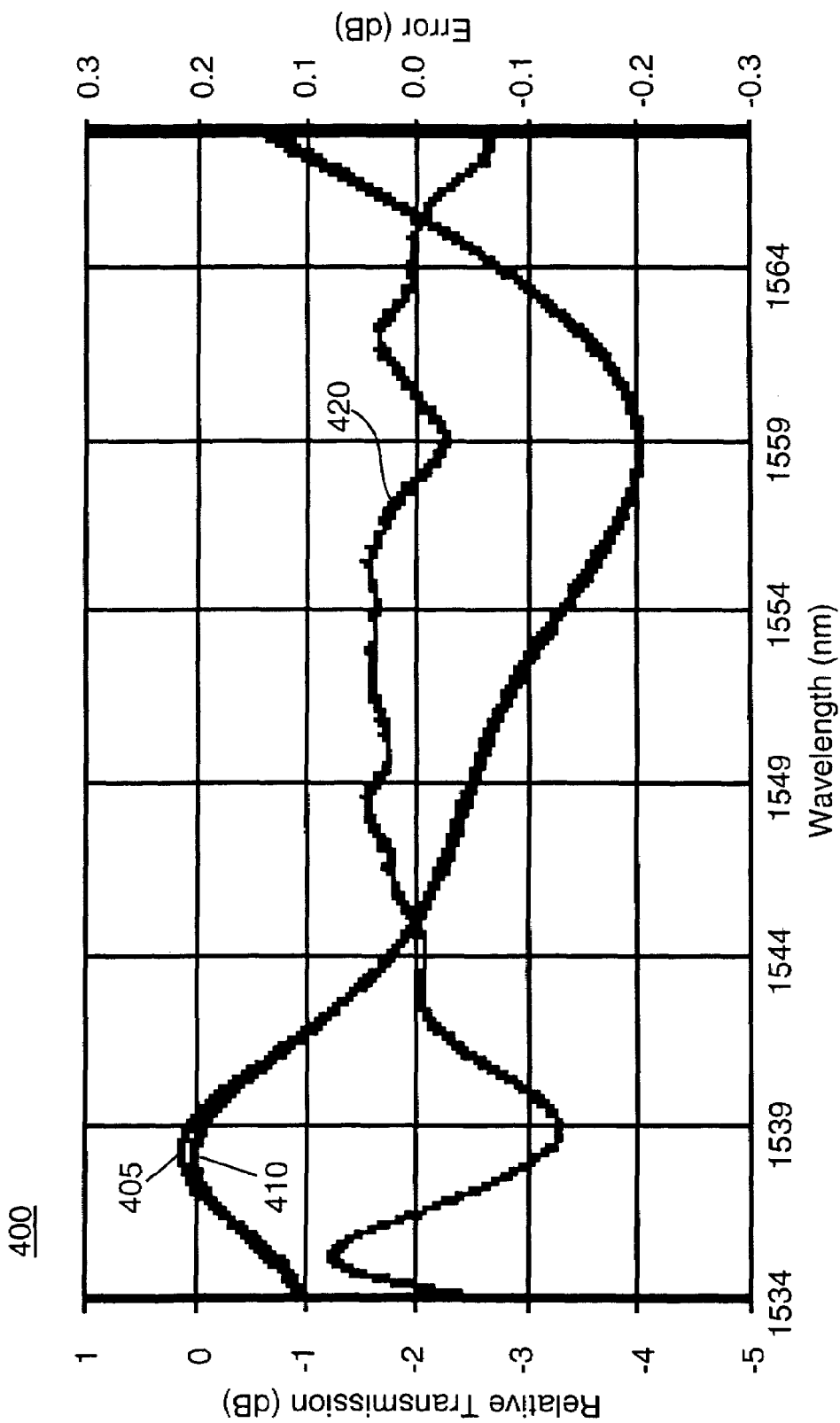
FIG. 7a is a graph, plotted with respect to wavelength, showing the actual transmission curve of a fiber Bragg grating synthesized according to a prior-art technique, the target transmission spectrum and the difference therebetween.
Figure 7B:
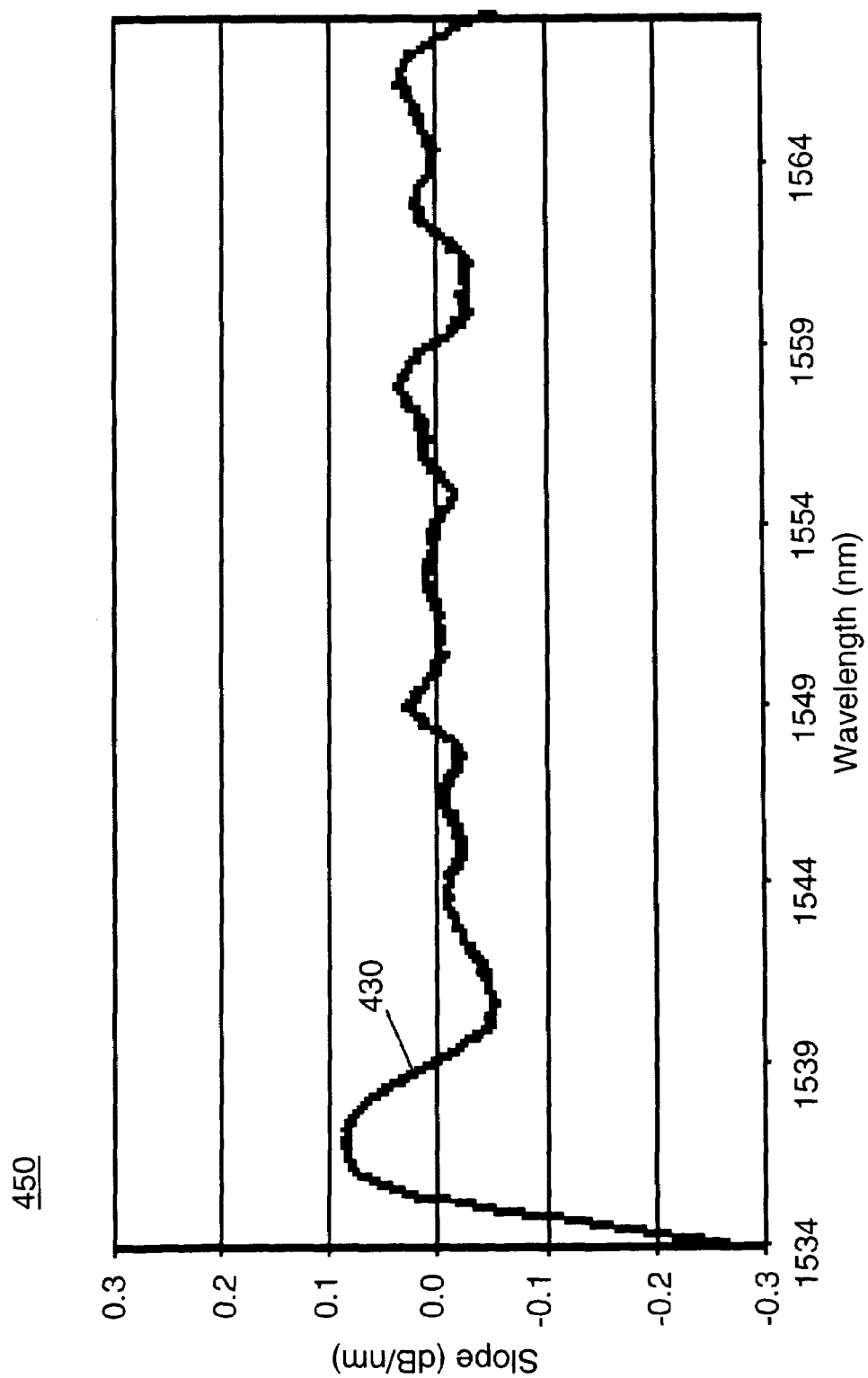
FIG. 7b is graph, plotted with respect to wavelength, showing the derivative of the difference between the actual and target transmission spectra of a fiber Bragg grating synthesized according to a prior-art technique.
Figure 8A:
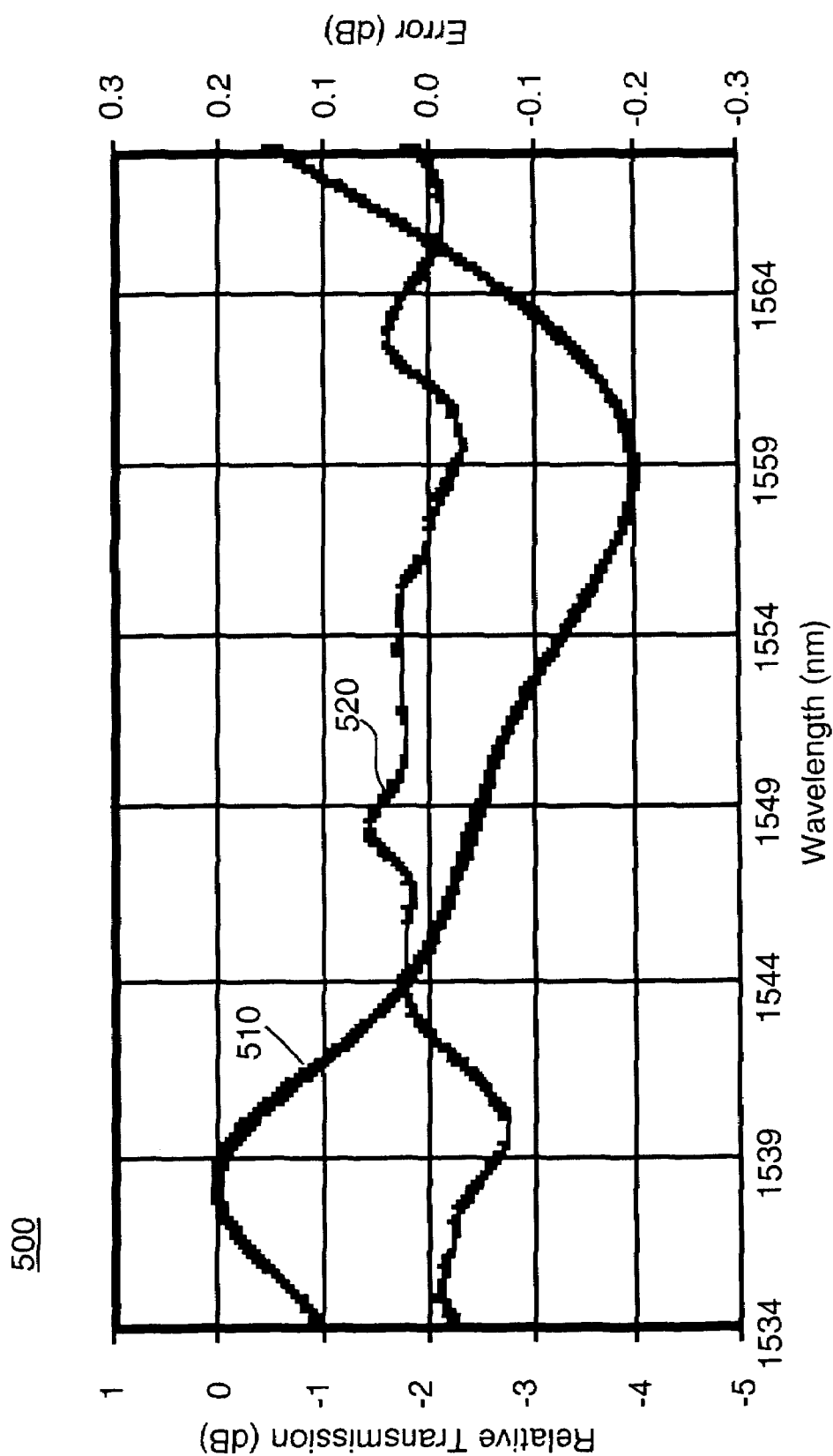
FIG. 8a is a graph, plotted with respect to wavelength, showing the actual transmission curve of a fiber Bragg grating synthesized according to a method in accordance with the present invention and the difference between the actual transmission curve and a target spectrum.
Figure 8B:
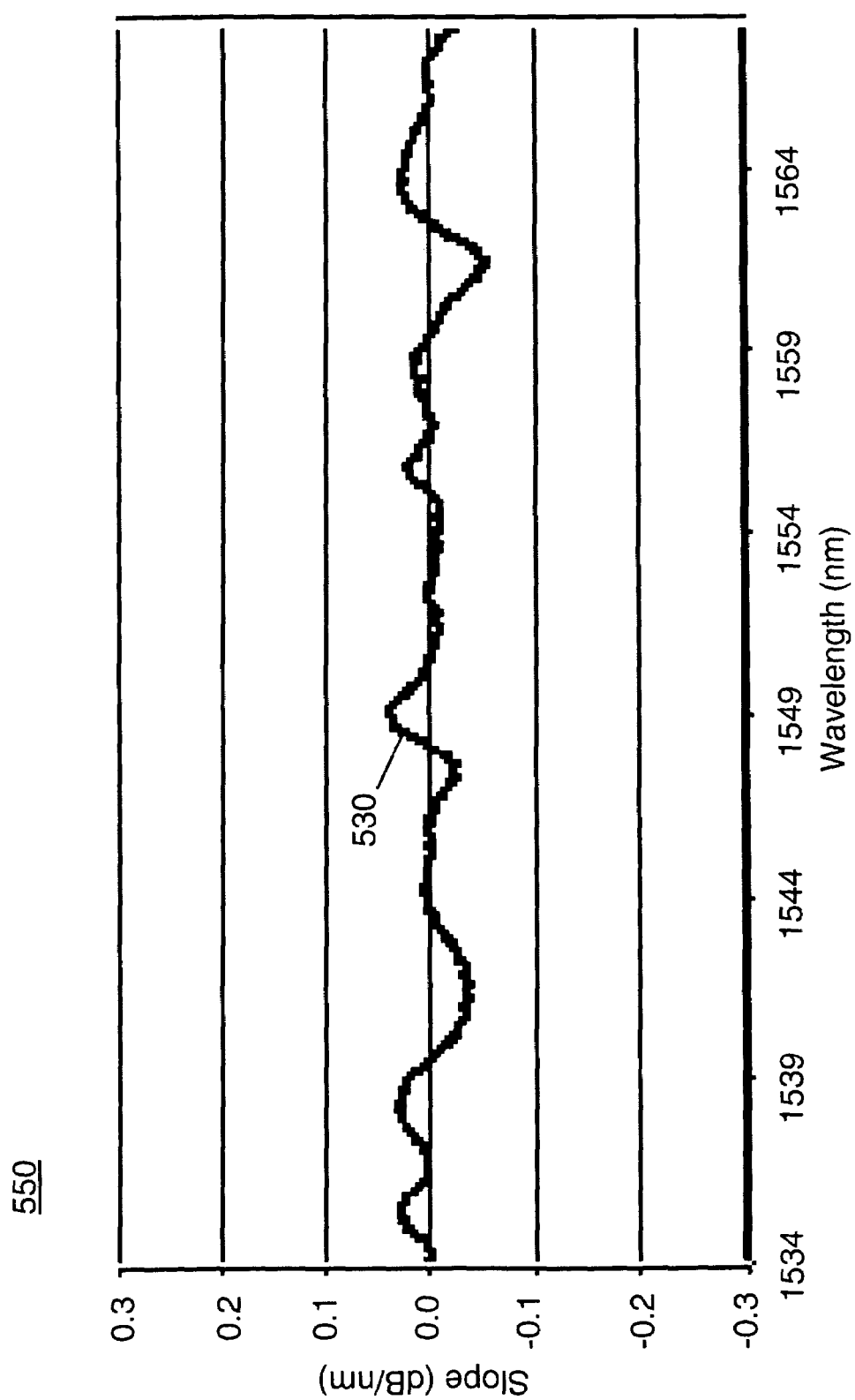
FIG. 8b is a graph, plotted with respect to wavelength, showing the derivative of the difference between the actual and target transmission spectra of a fiber Bragg grating synthesized according to a method in accordance with the present invention.

FIG. 7a is a graph 400, plotted with respect to wavelength, showing the actual transmission curve 405 of a fiber Bragg grating synthesized according to a prior-art single-fiber constant-mean-index SBG technique, the target or template transmission spectrum 410 and the difference 420 therebetween. FIG. 7b is graph, plotted with respect to wavelength, showing a curve 430 that plots the derivative of the difference between the actual and target transmission spectra of a fiber Bragg grating synthesized according to the same prior-art technique. FIGS. 8a-8b present similar results to those shown in FIGS. 7a-7b, respectively, obtained for a gain-flattening filter in accordance with the present invention. FIG. 8a is a graph 500, plotted with respect to wavelength, showing the actual transmission curve 510 of a fiber Bragg grating synthesized according to a method in accordance with the present invention and a curve 520 representing the difference between the actual transmission curve and the template. FIG. 8b is a graph 550, plotted with respect to wavelength, showing a curve 530 that plots the derivative of the difference between the actual and target transmission spectra of a fiber Bragg grating synthesized according to a method in accordance with the present invention.

It is clear that a better match of the template function is achieved when comparing the two error profiles (curve 420 of graph 400 in FIG. 7a and curve 520 of graph 500 in FIG. 8a). Small scale oscillations are suppressed within a gain flattening filter manufactured in accordance with the present invention because the superimposition or increased spectral overlap of the elementary filters allows a small spectral separation (small Δλ) between adjacent filters. This reduced spectral separation changes the period and the amplitude of the oscillations. In comparison to the prior-art gain flattening filter, the variations are especially reduced at both the beginning and at the end of the spectral profile using the present invention. Additionally, the derivative of the error with respect to wavelength (curve 530 of graph 550 in FIG. 8b) is limited to a greatly reduced range relative to a filter produced as in the prior art (curve 430 of graph 450 in FIG. 7b). The prior-art gain-flattening filter clearly exhibits high errors and variations of errors at the beginning of the spectral range that could lead to intolerable system impairments. These errors and their variations are reduced to an acceptable level within a gain-flattening filter in accordance with the present invention.

Since a gain-flattening filter device in accordance with the present invention produces a better fit of the template and a reduced level of the derivative of the error over the full bandwidth, such a device is expected to reduce system gain perturbations down to levels that will reduce the transmission system design complexities and device allocations along an optical transmission.

In summary, the present invention provides three main advantages relative to the prior art: (1) a reduction of the manufacturing time since the writing procedure does not require an identical writing time, regardless of the desired spectral contrast, for each FBG elementary filter; (2) suppression of systematic small-scale oscillations in the error deviation vs. template; and (3) improved match to the template attenuation spectrum.

Although the present invention has been described in accordance with the embodiments shown and discussed, one of ordinary skill in the art will readily recognize that there could be variations to the embodiments and those variations would be within the spirit and scope of the present invention. Accordingly, many modifications may be made by one of ordinary skill in the art without departing from the spirit and scope of the invention, which is defined by the appended claims.

What is claimed is:

1. An optical transmission system comprising:
    an optical amplifier having an Erbium-doped fiber outputting a plurality of wavelengths, the optical power of the wavelengths being a non-constant function of wavelength; and
    an optical filter optically coupled to an output of the Erbium-doped fiber, comprising:
        a waveguide, and
        a plurality of Slanted Bragg Gratings written in the waveguide, wherein at least two of the Slanted Bragg Gratings overlap one another, wherein a transmission function of the optical filter compensates the non-constant function.

2. The optical transmission system of claim 1, wherein the waveguide is an optical fiber.

3. The optical filter of claim 1, wherein each one of the Slanted Bragg Gratings has a respective length, wherein the length of a first one of the Slanted Bragg Gratings is unequal to the length of a second one of the Slanted Bragg Gratings.

4. The optical filter of claim 1, wherein the plurality of Slanted Bragg Gratings comprises at least three Slanted Bragg Gratings, wherein each Slanted Bragg Grating has a respective center and each pair of consecutive Slanted Bragg Gratings has a respective separation distance between centers, wherein a first separation distance is unequal to a second separation distance.

5. A method of producing an optical filter, comprising the steps of:
    passing ultraviolet light through a first portion of a chirped phase mask onto a first portion of a photosensitive waveguide so as to form a first Slanted Bragg Grating in the first portion of the waveguide; and
    passing ultraviolet light through a second portion of the chirped phase mask onto a second portion of the photosensitive waveguide so as to form a second Slanted Bragg Grating in the second portion of the waveguide, wherein the first and second Slanted Bragg Gratings overlap one another.

6. The method of claim 5, wherein the waveguide is an optical fiber.

7. The method of claim 5, wherein the first and second portions of the chirped phase mask overlap one another.

8. The method of claim 5, wherein a length of the first Slanted Bragg Grating is unequal to a length of the second Slanted Bragg Grating.

9. The method of claim 5, comprising the further step of:
    annealing the waveguide, the annealing causing a transmission spectrum of the filter to match a target transmission spectrum.

10. The method of claim 9, wherein the target transmission spectrum is capable of compensating a gain spectrum of an optical amplifier.

11. An optical filter comprising:
    a waveguide; and
    a plurality of at least three Slanted Bragg Gratings written in the waveguide, wherein at least two of the Slanted Bragg Gratings overlap one another, wherein each Slanted Bragg Grating has a respective spectrum with a center wavelength, and the difference between center wavelengths of a first pair of consecutive Slanted Bragg Gratings is unequal to the difference between center wavelengths of a second pair of consecutive Slanted Bragg Gratings.

12. An optical filter comprising:
    a waveguide; and
    a plurality of Slanted Bragg Gratings written in the waveguide, wherein at least two of the Slanted Bragg Gratings have a common spatial region and overlap one another, wherein a transmission spectrum of the filter is capable of compensating a gain spectrum of an optical amplifier.

* * * * *